Dec. 6, 1949    R. U. McKINNEY    2,490,461
APPARATUS FOR SEISMIC PROSPECTING
Filed April 12, 1946    2 Sheets-Sheet 1
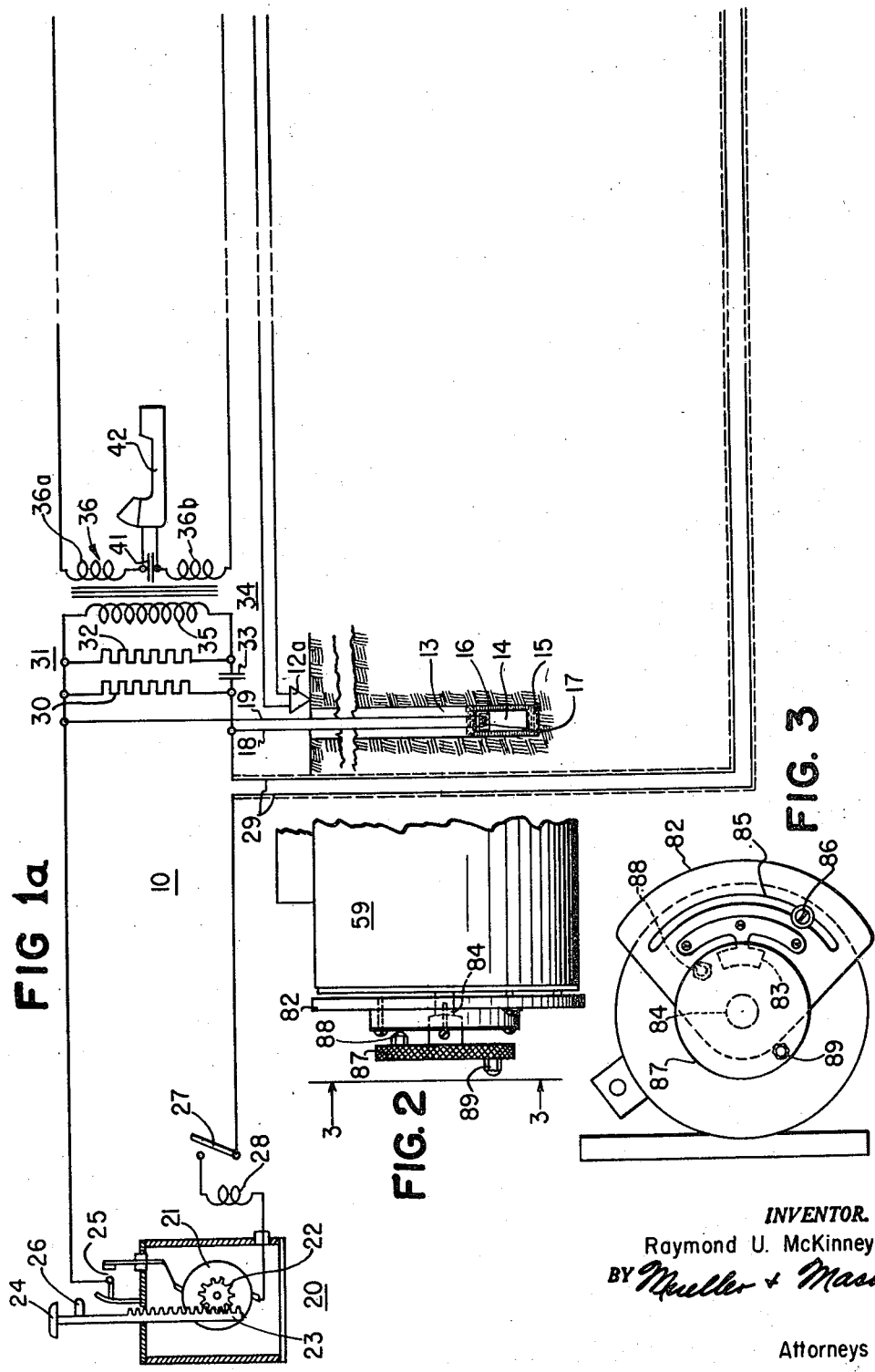
INVENTOR.
Raymond U. McKinney
BY Mueller + Mason
Attorneys Dec. 6, 1949  R. U. McKINNEY  2,490,461
APPARATUS FOR SEISMIC PROSPECTING
Filed April 12, 1946  2 Sheets-Sheet 2
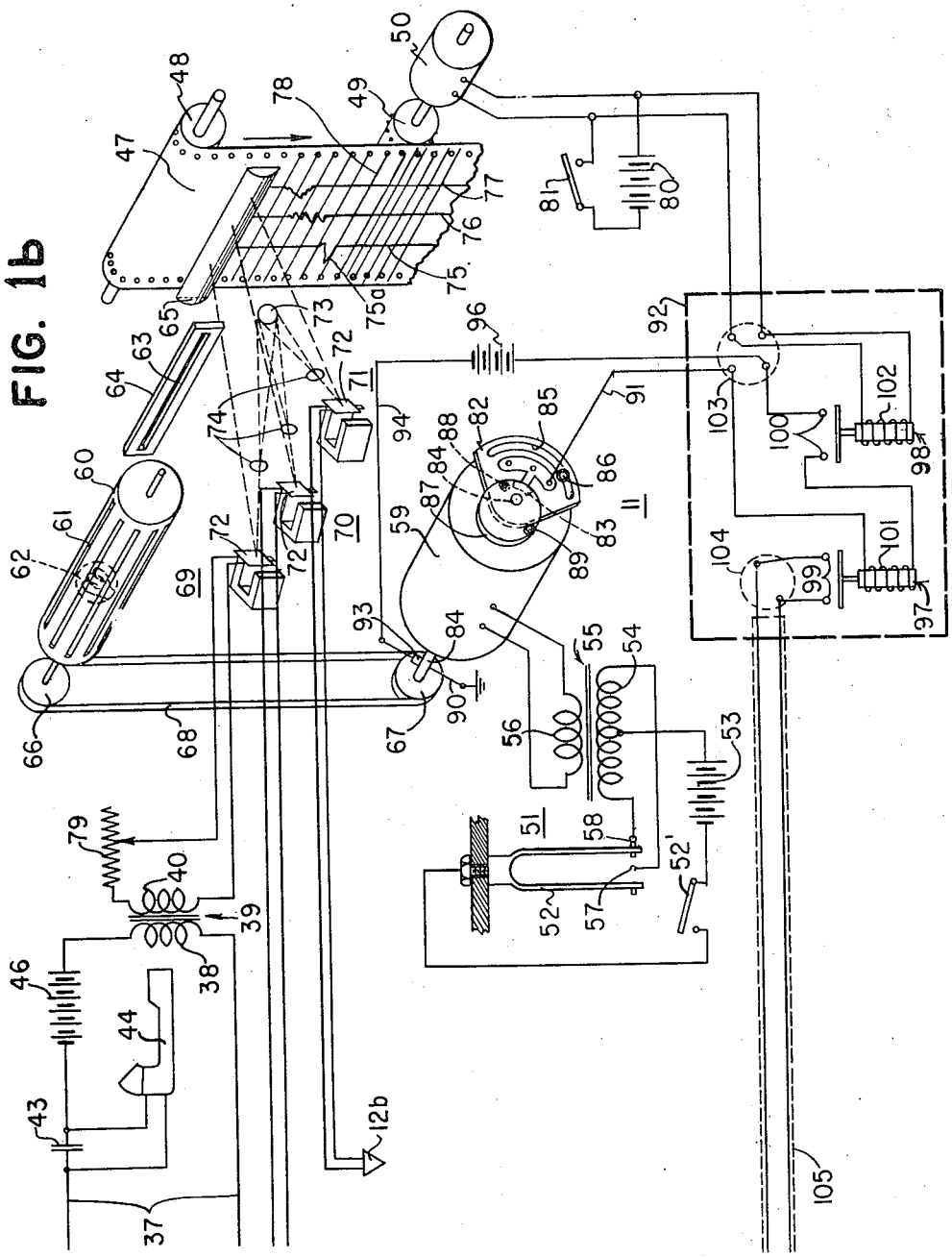
INVENTOR.
Raymond U. McKinney
BY Mueller & Mason
Attorneys Patented Dec. 6, 1949

2,490,461

UNITED STATES PATENT OFFICE 2,490,461

APPARATUS FOR SEISMIC PROSPECTING

Raymond U. McKinney, Nowata, Okla., assignor, by mesne assignments, to Seismograph Service Corporation, Tulsa, Okla., a corporation of Delaware Application April 12, 1946, Serial No. 661,492

10 Claims. (Cl. 346—33)

The present invention relates to improvements in apparatus for seismic prospecting.

Seismic prospecting is the process for determining the depth, inclination and thickness of sub-surface strata and is usually carried out by firing a charge of dynamite at some appropriate point beneath the surface of the ground and measuring the time required for the seismic waves so generated to reach one or more stations spaced at intervals from the charge. With a knowledge of the time and approximate velocities of travel of the waves set up by the explosion of the charge, determinations can be made of the depth, slope and thickness of various strata. The two most important factors in connection with seismic prospecting are (1) to record and make available for the record at each receiving station the exact instant of detonation of the charge and (2) to record the time of arrival of each reflected or refracted wave.

It is more or less common practice in seismic surveying or prospecting to produce a record on a moving strip or tape of the instant of firing the charge or the "time break" followed by a record of the seismic waves which are received at a plurality of points spaced from each other and from the point of initiation of the seismic impulse. It is customary in recording this matter to also produce on the moving tape timing lines spaced at predetermined intervals such as one-hundredth second or the like, thereby enabling the observer to read the recorded matter and obtain data therefrom in a simple manner. All of the information appearing on the record must be related to the instant of detonation of the charge, or in other words, to the "time break." If the "time break" does not happen to fall exactly on a timing line, a time increment must be added to or subtracted from the zero timing line and this time increment must be utilized in connection with every other reading taken from the record. This greatly complicates the time and labor in getting the desired information from the record and also offers considerable possibilty for error in interpretation. It is desirable, therefore, to provide an arrangement which is simple and accurate and yet which insures that the "time break" signal or exact instant of the firing of the charge initiating the seismic waves always coincides with a timing line so that other readings from the record can be obtained without adding or subtracting an increment to take care of a discrepancy between the "time break" signal and the closest timing line.

Accordingly, it is an object of the present invention to provide new and improved apparatus for seismic prospecting.

It is another object of the invention to provide new and improved apparatus for seismic prospecting which is simple and compact and which insures that the "time break" signal falls exactly on a timing line.

It is still another object of the invention to provide a new and improved seismic prospecting system whereby the operation of the recording mechanism is so coordinated with the creation of the seismic impulse that the timing record is directly related to the initation of the event which gives rise to the seismic impulses.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Figs. 1a and 1b together schematically illustrate improved apparatus for seismic prospecting embodying the present invention;

Fig. 2 is an elevational view of one of the components of the apparatus shown in Figs. 1a and 1b; and Fig. 3 is a view taken on line 3—3 of Fig. 2.

Referring now to Figs. 1a and 1b of the drawings, there is illustrated a seismic prospecting system which comprises apparatus associated with the "shot point" or blasting station generally indicated at 10 and apparatus associated with a recorder station generally indicated at 11, together with a plurality of seismic detectors or geophones indicated at 12a and 12b which are spaced at various points from the "shot point" and are so connected with the recorder station as to transmit signals to the recorder station. It will be understood that a large number of such seismic detectors or geophones 12 are normally employed which may be spaced from the "shot point" by different amounts and in different arrays. In order to simplify the drawings, however, only two detectors; namely, 12a and 12b, have been shown.

Referring now to the "shot point" or blasting station 10, having the function of creating elastic or seismic waves, it is customary for the blasting charge, which is generally the source of such elastic waves, to vary from a few pounds to a great many pounds of blasting material. This charge is usually arranged at the bottom of a bore hole, such as that indicated at 13, which bore hole may be 30 or more feet deep so as to insure that the charge is below the weathered layer of the earth and in material capable of effective delivery of seismic energy. The bore hole 13 is loaded, as shown in Fig. 1a, with an explosive 14 and is customarily filled with water indicated at 15 after the charge 14 is placed therein. Embedded within the charge 14 is a detonator cap 16 of the electrically ignited type having a bridge wire 17 which is adapted to be electrically energized to ignite the fulminating material within the cap 16, thereby to set off the main explosive 14.

In order to energize the bridge wire 17, it is connected by suitable conductors 18 and 19 with the terminals of a blasting machine generally indicated at 20, which comprises a direct current generator 21 arranged for manual operation by means of a rotor pinion 22 connected through a one-way driving connection with the generator rotor shaft and engageable with a rack associated with a manually operable plunger 23. Upon pushing down on the plunger handle 24, the direct current generator 21 is rotated to generate a direct current voltage across the terminals thereof. This generator may have a peak voltage output of 200 to 300 volts at no load and should be capable of producing a maximum current of 10 amperes. Preferably the output circuit of generator 21 is held open until the generator has attained a desirable speed. This is accomplished by means of a switch 25 which is closed by virtue of an extension 26 on the plunger 23 when the plunger 23 approaches the bottom of its operating stroke. This permits the generator 21 to be brought up to speed at no load and the closing of the switch 25 applies current suddenly to the circuit connected to the conductors 18 and 19 leading to the bridge wire 17. If desired, a suitable manually operable switch 27 and an inductance or choke coil 28 may be provided in series with the terminals of the generator 21 and the bridge wire 17. In addition, a circuit comprising a pair of conductors 29, to be described in greater detail hereinafter is connected in series with the blasting machine 20 and the bridge wire 17. The switch 27 is normally open except when a blasting operation is to be performed and consequently prevents detonation of the charge 14 by inadvertent operation of the blasting machine 20. The choke coil or inductance 28 is provided to eliminate commutator ripples produced by the generator 21, to prevent a too rapid build-up of current which might rupture the bridge wire 17 before it is broken by detonation of the charge, and to prevent the recording of false time breaks upon the record. This choke coil should obviously be capable of passing a current of 10 amperes. By virtue of the improved construction of modern caps, the choke coil may, in many cases, be dispensed with entirely. Caps 16 including bridge wire 17 now available on the market, are so designed that breaking of the bridge wire will occur only in response to charge detonation and not in response to high current flow therethrough prior to actual detonation of the charge or blast 14.

In order that the exact time of firing or "time break" at the "shot point" may be recorded at the recorder station 11 it is desirable to transmit the impulse produced by the breaking of the bridge wire 17, to this station by suitable means such as telephone or radio. To this end a resistor 30 is connected in parallel with bridge wire 17 across the terminals of the generator 21 to have a high voltage developed thereacross when the bridge wire 17 is broken to suddenly interrupt current flow therethrough. The resistance of the resistor 30 should be much higher than the resistance of the bridge wire 17 so that a very low current flows through resistor 30 and consequently a very low voltage appears across the resistor 30 while the bridge wire 17 is intact. The high voltage suddenly appearing across the resistor 30 upon breaking of the bridge wire 17 produces the desired time signal which is transmitted to the recorder station 11 and there recorded on a suitable moving strip or tape together with the timing lines and detected seismic signals.

In order to accentuate the high frequency components of the "time break" signal appearing across the resistor 30 it has been the practice to employ a derivator circuit of the character generally indicated at 31 which functions electrically to perform the equivalent of a mathematical derivation of the voltage suddenly created across resistor 30 by the breaking of the bridge wire 17. The derivator circuit 31 comprises a serially arranged resistor 32 and capacitor 33 connected across the resistor 30. The resistance of the resistor 32 and the capacitance of the capacitor 33 are so proportioned that the current flowing in this series circuit is substantially 90° ahead of the voltage across the resistor 32 so that the voltage across the resistor 32 is substantially proportional to the derivative of the applied voltage across the resistor 30. The resistor 30 also acts to limit the electrical surge applied to the derivator circuit 31 comprising the serially arranged resistor 32 and capacitor 33.

In order that the signal voltage appearing at the output of the derivator circuit 31 or in other words across the resistor 32 may be transmitted to the recorder station 11, a transformer 34 is provided having its primary winding 35 connected across the terminals of the resistor 32. The terminals of the transformer secondary winding 36 are connected to a telephone circuit comprising a pair of conductors 37 which extend to the recorder station 11 where they are connected to the terminals of the primary winding 38 of a transformer 39 having a secondary winding 40. The dashed portions of the conductors 37 indicate that a considerable distance exists between the blasting station 10 and the recorder station 11.

It is usually desirable that direct telephonic communication between the blasting station 10 and the recorder station 11 may be had and to this end the winding 36 is divided into two parts 36a and 36b which are interconnected by a capacitor 41 across which a telephone instrument 42 may be provided. At the recorder station a capacitor 43 is provided across which is connected a telephone instrument 44. A suitable battery 46 in series with the conductors 37 supplies the necessary energy for the telephone instruments 42 and 44.

In order to obtain a permanent record of the seismic events occurring during and following the instant of detonation of the charge 14 at the blasting station 10 a recorder (usually of the 12 or 24 trace oscillographic type) is provided at the recorder station 11. Briefly, the illustrated recorder comprises a movable strip of sensitized paper generally indicated at 47, which is movable from a suitable supply spool 48 to a take-up spool, not shown, by means of a sprocket 49 which is provided with teeth for engaging edge perforations in the sensitized strip 47. A suitable tape or strip driving motor 50 connected to the roller 49 causes the paper to be transferred from the roller 48 to the take-up spool. The sensitized paper or strip 47 is preferably of the type which has a record produced thereon when subjected to a beam of light and subsequently developed in the same manner as a film employed in a camera.

In order to provide a time record it is customary to place timing lines on the sensitized strip 47 while the seismic events are actually being recorded. It is obvious that in order to obtain timing lines accurately representative of intervals of one-tenth or one-hundredth of a second, it is necessary to have a synchronous motor of some sort and a source of constant frequency potential. Since seismic prospecting parties may operate at a considerable distance from a source of alternating current, all of their equipment being usually mounted on a truck or series of trucks, it is necessary to provide a constant frequency generator which is preferably operable from a source of direct current potential such as a battery. Accordingly in Fig. 1b there is illustrated a frequency generator generally indicated at 51 which comprises an electrically driven fork 52. A source of battery potential 53 is connected through a manually operable switch 52' and the fork 52 through a primary winding 54 of a transformer 55 having a secondary winding 56. The fork 52 functions to commutate current flow through the primary winding 54 of the transformer 55 so that an alternating voltage is developed across the transformer winding 56. Specifically the flux produced by the primary winding 54 drives the fork 52 by repelling and attracting it in response to the flow of current through first one half and then the other half thereof to contact first a contact 57 and then a contact 58. As illustrated the contact 58 is closed when the switch 52' is open. As the fork 52 engages its associated contacts 57 and 58, pulses of current flow alternately through the two halves of the primary winding 54 so as to produce an alternating current of constant frequency in the winding 56, which is connected to energize a synchronous timing motor 59. This timing motor 59 is connected to drive suitable means for applying timing lines to sensitized paper or strip 47. In the illustrated arrangement, the timing motor 59 is connected to drive a drum 60 which is provided with a plurality of uniformly spaced slits 61 extending longitudinally of the drum through which light from a source 62 within the drum 60 may be transmitted. This light is adapted to pass through a slit 63 in a screening plate 64 and then through a lens 65 to produce a record line on the sensitized strip 47. The plate 64 insures that the light from only the particular slit 61 in drum 60 which is in registry therewith can reach the sensitized paper 47 through the lens 65. Preferably the timing motor 59 and the drum 60 are mounted on a common shaft. In order to simplify the drawings, however, the timing motor 59 and drum 60 are illustrated as being interconnected by means of a pair of sprockets 66 and 67 and a chain 68.

In order that the instant of detonation and the seismic events which follow may be recorded on sensitized paper 47 in addition to the uniformly spaced timing lines, the recorder is further equipped with a plurality of oscillographic elements generally indicated at 69, 70 and 71 in Fig. 1b of the drawings. Each of the oscillographic elements 69, 70 and 71 may be of any general well-known type such as a coil rotating in a magnetic field and bearing a mirror 72, whereby light from a light source 73 passing through appropriate lenses 74 impinges against the mirrors 72 from which the light beams are reflected to the lens 65 and thence on to the sensitized strip 47. As the mirrors 72 rotates in response to rotation of the associated oscillographic coils a plurality of traces 75, 76 and 77 are made on the sensitized strip 47, movement of the mirrors 72 causing displacement of the light beams in a horizontal direction with reference to Fig. 1b of the drawings. It will be understood that the timing lines produced by virtue of the rotation of timing motor 59 and drum 60 are placed on sensitized strip 47 simultaneously with the traces 75, 76 and 77 as indicated at 78 in Fig. 1b of the drawings. In order better to understand the operation of the seismic apparatus embodying the present invention, a typical record is shown on sensitized strip 47 just as might appear thereon at a particular instant during the recording of the seismic events.

For the purpose of recording the instant of detonation on the sensitized moving strip 47 the secondary winding 40 of the transformer 39 is connected through an adjustable resistor 79 with the oscillograph element 69, thereby to produce the trace 75 on the sensitized strip. In this trace, the break 75a indicates the detonation of the charge 14 and simultaneous break of the bridge wire 17. The adjustable resistance 79 is provided to control the deflection of the mirror embodied in the oscillographic element 69.

The other oscillographic elements 70 and 71 are connected to the seismic detectors or geophones 12a and 12b, respectively, in order to record the seismic signals picked up by these detectors. It should be understood that although only two such oscillographic elements 70 and 71 are illustrated, that many more are usually employed which are connected to additional seismic detectors or geophones spaced at appropriate points from the "shot point." It will also be understood that the oscillographic element 69 which is illustrated as producing the time break indicating trace 75 on the sensitized strip 47 can also be connected to a seismic detector or geophone and perform both functions since the bridge break record 75a is completely recorded in the trace 75 before any other pertinent information is obtained on the sensitized strip 47.

From the above explanation it will be apparent that the timing lines are placed on the paper as the seismic events are recorded thereon so that the proper relationship between the receipt of reflected or refracted seismic energy and time is obtained even if the tape or strip driving motor 50, which is preferably a constant speed motor, does not maintain constant speed. Variations in the speed of this motor result in unequal spacing of the timing lines along the sensitized strip 47. Preferably the strip driving motor 50 is a direct current motor supplied with energy from a suitable battery 80 which is connected to the strip driving motor 50 through a manually operable switch 81.

As pointed out above it is desirable that the break 75a in the trace 75, which is representative of the instant of detonation of the charge 14 and accompanying breaking of the bridge wire 17, fall exactly on a timing line such as 78 in order to facilitate interpretation of the data appearing on the sensitized strip 47. In accordance with the present invention this is accomplished by providing an adjustable timing control means associated with the timing motor 59, which timing control means is arranged to govern the operation of the blasting machine 20. As illustrated in the drawings and particularly in Figs. 2 and 3 thereof, the timing motor 59 supports an adjustable sector or vernier 82 formed of insulating material and having mounted thereon a stationary contact 83 preferably formed of a thin strip of beryllium copper coated with silver or the like. This contact forms one part of a rotary switch to be described hereinafter. The sector or vernier 82 is pivotally mounted about the shaft 84 of the timing motor 59 and is provided with an arcuate slot 85 so arranged that the sector or vernier 82 may be adjustably positioned by means of a screw 86 about the shaft 84. Rotatable with the shaft 84 of the timing motor 59 is a timer knob 87 which is provided on its side adjacent motor 59 with a contact 88 which is preferably in the form of a hexagonal screw with the end coated with silver and rounded off so as to provide a satisfactory contact for engagement with the stationary contact 83 during rotation of the timing motor shaft 84. A duplicate hexagonal screw 89 is provided on the opposite side of the knob 87 from contact 88 and also diametrically opposed therefrom in order to counterbalance the knob. This duplicate screw 89 can also be used as a duplicate rotating contact in the event contact duplication is necessary. The shaft 84 of the timing motor 59 is preferably grounded as indicated at 90 in Fig. 1b of the drawings. The stationary contact 83 is connected by means of a conductor 91 with a relay unit 92 to be described hereinafter. Similarly the grounded motor shaft 84 is connected through a brush 93 and a conductor 94 to one terminal of a battery 96, the other terminal of which is connected to the relay unit 92.

The relay unit 92 which is preferably a unitary structure comprises a plurality of normally open relays 97 and 98 adapted to control normally open contacts 99 and 100, respectively. The relay 97 is provided with a winding 101 which is connected in series with the contacts 100 of the relay 98 to the conductor 91 and the terminal of the battery 96, respectively, associated with the timing motor 59. The winding 102 of the relay 98 on the other hand is connected in parallel with the strip driving motor 50, across the battery 80. Preferably the windings 101 and 102 of the relays 97 and 98 are connected to the external circuits described through a suitable disconnecting plug schematically indicated at 103. As indicated, this plug 103 is necessarily of four-prong construction. The contacts 99 of the relay 97 on the other hand are preferably connected through a suitable disconnecting plug generally indicated at 104 with the circuit comprising the conductors 29 referred to above. Preferably the conductors 29 are shielded as indicated at 105 in order to prevent stray currents from interfering with the telephone communication between the blasting and recorder stations 10 and 11, respectively. From the above discussion it will be understood that the contacts 99 must be closed before the blasting machine 20 can supply power to the bridge wire 17 since the contacts 99 are arranged in series therewith.

With the arrangement described above it is possible to provide a recording in which the instant of breaking of the bridge wire 17 is recorded on the sensitized strip 47 in coincidence with a zero timing line. It is assumed that for a particular set-up the time lag in the system disclosed in Figs. 1a and 1b of the drawings between the closing of the relays 101 and 102 and the actual instant of detonation is a constant within the limits of accuracy required. This assumption is justified when a blasting generator 21 is employed capable of producing a maximum current of 10 amperes. Moreover, this time lag can then be controlled by adjusting the sector or vernier 82 to change the instant of engagement of the contacts 88 and 83.

In the operation of the seismic apparatus comprising the present invention the operator at the blasting station and the operator at the recorder station can keep each other informed as to the conditions at each station by employing the telephone instruments 42 and 44, respectively. When everything is in readiness at each station, the operator at the blasting station 10 will close the manually operable switch 27 and the operator at the recorder station 11 will close the switch 81 to start the strip driving motor 50 operating and will also close the switch 52 to energize the timer motor 59. As soon as the strip driving motor 50 is energized, the relay 98 connected in parallel therewith is energized to close its contacts 100. Thereafter, the relay 97 is periodically energized as the timing motor 59 rotates to move the contacts 83 and 88 periodically into engagement. Preferably the relay 97 is of the type which is capable of between 25 and 30 operations per second. It is obvious that the bridge wire 17 is connected to the blasting generator 20 only during the intervals that the relay 97 closes its contacts 99. The operator at the blasting station 10 then operates blasting machine 20 by pushing downwardly on the handle 24 of the plunger 23. As the plunger nears the bottom of its stroke the switch 25 is closed to prepare the circuit for energizing the bridge wire from the blasting generator 20, providing the contacts 99 of the relay 97 are not already closed. The next time that the contacts 99 of the relay 97 close, which will occur the next time that the contacts 83 and 88 associated with the timing motor 59 are in engagement, the high current from the blasting generator 21 flowing through bridge wire 17 will cause detonation of the charge 14 with the resultant breaking of the bridge wire 17. The high voltage suddenly appearing across the resistor 30 upon breaking of the bridge wire 17 produces a break 75a in the time break indicating trace 75 on the sensitized strip 47. By proper adjustment of the vernier or sector 82, this break 75a in the time break indicating trace 75 can be made to coincide with a timing line 78, whereby data may be obtained from the sensitized strip 47 without adding or subtracting a small increment to each reading with the consequent possibilty of error and the greater amount of time consumed in performing this extra work.

The position of the vernier or sector 82 relative to the timing motor 59 will normally be adjusted initially for a particular set-up after which the instant of detonation of the charge will appear on the sensitized strip 47 and will fall exactly on a particular timing line as shown in Fig. 1b of the drawings.

Although the apparatus described above has been illustrated as employing telephonic communication between the blasting and recorder stations it will be apparent that radio communication may equally well be employed. It will also be understood that a very simple arrangement which is fairly foolproof is provided for insuring that the instant of detonation as recorded on the sensitized movable strip 47 coincides with a timing line, whereby calculations with reference to such a timing line can readily be made.

It should be understood that the present invention is not limited to the specific construction and arrangement described above and that changes and modifications may occur to those skilled in the art without departing from the spirit and scope of the present invention. It is, therefore, aimed in the appended claims to cover all such changes and modifications.

I claim:

1. Seismic prospecting apparatus comprising shot point and recorder stations in spaced relationship, a source of elastic waves at said shot point station, means at said shot point station for energizing said source, means for driving a record strip at said recorder, means including a timing motor for recording on said record strip spaced timing lines, means for recording on said record strip the instant of creation of said elastic waves, a first relay at said recorder station for controlling the operation of said first-mentioned means, adjustable means associated with said timing motor for periodically energizing said first relay in response to rotation of said timing motor, a second relay for preventing the energization of said first relay until said means for driving said record strip is energized, and means for adjusting said adjustable means so that the instant of creation of said elastic waves as recorded on said record strip coincides exactly with one of said timing lines produced on said record strip.

2. Seismic prospecting apparatus comprising shot point and recorder stations in spaced relationship, a source of elastic waves at said shot point station comprising a charge of detonatable material, detonating means at said shot point station, means including a motor for driving a record strip at said recorder station, means including a timing motor for recording on said record strip spaced timing lines, means for recording on said record strip the instant of detonation of said charge, a first relay at said recorder station for controlling the operation of said detonating means, means driven by said timing motor for periodically energizing said first relay in response to rotation of said timing motor, a second relay for preventing the energization of said first relay until said motor for driving said record strip is energized, and means for adjusting said last mentioned means so that the instant of detonation of said charge as recorded on said record strip coincides exactly with one of said timing lines produced on said record strip.

3. Seismic prospecting apparatus comprising shot point and recorder stations in spaced relationship, a source of elastic waves at said shot point station comprising a charge of detonatable material, a blasting generator at said shot point station capable of causing detonation of said charge, means including a motor for driving a record strip at said recorder station, means including a synchronous timing motor for recording on said record strip uniformly spaced timing lines, means for recording on said record strip the instant of detonation of said charge, means for recording on said record strip the seismic events which follow after the instant of detonation, a first relay at said recorder station including a pair of contacts, means for connecting said contacts in series with the output terminals of said blasting generator, adjustable means associated with said timing motor for periodically causing said first relay to close said contacts in response to rotation of said timing motor, a second relay for preventing the energization of said first relay until said motor for driving said record strip is energized, and means for adjusting said adjustable means so that the instant of detonation of said charge as recorded on said record strip coincides exactly with one of said simultaneously produced timing lines.

4. In an apparatus for seismic surveying, a blasting station, a recorder station spaced from said blasting station but interconnected therewith by communication means, a source of seismic waves, a blasting circuit at said blasting station for causing said source to create seismic waves including conductors extending to said recorder station, a source of power for energizing said circuit, a recorder at said recorder station for recording seismic waves, driving means for a movable record strip associated with said recorder, means including a timing motor for recording on said record strip spaced timing lines, means for recording on said record strip the instant of creation of said seismic waves, a first relay at said recorder station having its contacts connected in said blasting circuit, means associated with said timing motor for periodically energizing said first relay in response to rotation of said timing motor, a second relay having its contacts connected in series with said first relay so as to prevent the energization of said first relay until said driving means for said record strip is energized, and means for adjusting said last-mentioned means so that the instant of creation of said seismic waves as recorded on said record strip coincides exactly with one of said timing lines produced on said record strip.

5. Seismic prospecting apparatus comprising shot point and recorded stations in spaced relationship, a source of elastic waves at said shot point station comprising a charge of detonatable material, a blasting generator at said shot point station capable of causing detonation of said charge, a motor for driving a movable record strip at said recorder station, means including a synchronous timing motor for recording on said record strip uniformly spaced timing lines, means for recording on said record strip the instant of detonation of said charge, means for recording on said record strip the seismic events which follow after the instant of detonation, a first relay at said recorder station including a pair of contacts, means for connecting said contacts in series with the output terminals of said blasting generator, means associated with said timing motor for periodically causing said first relay to close said contacts in response to rotation of said timing motor, a second relay having its contacts connected in series with said first relay, means for energizing said second relay simultaneously with the energization of said motor for driving said record strip, and means for adjusting said last-mentioned means so that the instant of detonation of said charge as recorded on said record strip coincides exactly with one of said simultaneously produced timing lines.

6. In an apparatus for seismic surveying, a blasting station, a recorder station spaced from said blasting station but interconnected therewith by communication means, a charge of detonatable material for creating seismic waves, a blasting circuit at said blasting station for detonating said charge to create seismic waves including conductors extending to said recorder station, a source of power for energizing said circuit, a recorder including means for moving a record strip at said recorder station for recording said seismic waves, means including a timing motor for recording on said record strip spaced timing lines, means for recording on said record strip the instant of detonation of said charge, a first relay at said recorder station having its contacts connected in series with said blasting circuit, a rotary switch operatively connected with said timing motor for periodically energizing said first relay in response to rotation of said timing motor, a second relay for preventing the energization of said first relay until said driving means for said record strip is energized, and adjustable means for said rotary switch to vary the instant of closing thereof so that the instant of detonation of said charge as recorded on said record strip coincides exactly with one of said timing lines produced on said record strip.

7. In an apparatus for seismic surveying, a blasting station, a recorder station spaced from said blasting station, a source of seismic waves comprising a charge of detonatable material at said blasting station, a blasting circuit for detonating said charge to create seismic waves including a pair of conductors extending to said recorder station, a source of power for energizing said circuit, a recorder including means for moving a record strip at said recorder station for recording seismic waves, means including a timing motor for recording on said record strip spaced timing lines, means for recording on said record strip the instant of detonation of said charge, a first relay at said recorder station having its contacts connected to said pair of conductors, a rotary switch driven by said timing motor including a stationary contact, means for connecting the energization circuit of said first relay in series with said rotary switch for periodically energizing said first relay in response to rotation of said timing motor, a second relay having its contacts connected in series with said rotary switch, means for energizing said second relay simultaneously with the operation of said means for moving said record strip, and means for adjusting the position of the stationary contact of said rotary switch so that the instant of detonation of said charge as recorded on said record strip coincides with one of said timing lines produced on said record strip.

8. Seismic prospecting apparatus comprising shot point and recorder stations in spaced relationship, a source of elastic waves at said shot point station comprising a charge of detonatable material, a blasting generator at said shot point station capable of causing detonation of said charge, means including a motor for driving a record strip at said recorder station, means including a synchronous timing motor for recording on said record strip uniformly spaced timing lines, means for recording on said record strip the instant of detonation of said charge, means for recording on said record strip the seismic events which follow after the instant of detonation, a first relay at said recorder station including a pair of contacts, means for connecting said contacts in series with the output terminals of said blasting generator, a rotary switch driven by said timing motor and including a stationary contact connected in series with the energization circuit of said first relay for periodically causing said first relay to close said contacts in response to rotation of said timing motor, a second relay having its contacts connected in series with said rotary switch for preventing the energization of said first relay until said motor for driving said record strip is energized, and means for adjusting said stationary contact so that the instant of detonation of said charge as recorded on said record strip coincides exactly with one of said simultaneously produced timing lines.

9. Seismic prospecting apparatus comprising shot point and recorder stations in spaced relationship, a source of elastic waves at said shot point station, means at said shot point station for energizing said source, means including a timing motor for recording on a movable record strip at said recorder station spaced timing lines, means for recording on said record strip the instant of creation of said elastic waves, a relay at said recorder station for controlling the effective operation of said first-mentioned means, a rotary switch for causing said relay to be periodically energized in response to rotation of said timing motor including a first contact rotatable with the shaft of said timing motor, an adjustable member pivotally mounted to the end of said timing motor, a stationary contact on said member adapted for electrical engagement with said first contact, and means for adjusting said member to control the instant during the rotation of said first contact that electrical engagement with said stationary contact occurs whereby the instant of creation of said elastic waves as recorded on said record strip coincides exactly with one of said timing lines produced on said record strip.

10. Seismic prospecting apparatus comprising shot point and recorder stations in spaced relationship, a source of elastic waves at said shot point station, means at said shot point station for energizing said source, means including a timing motor for recording on a movable record strip at said recorder station spaced timing lines, means for recording on said record strip the instant of creation of said elastic waves, a relay at said recorder station for controlling the effective operation of said first-mentioned means, a rotary switch for causing said relay to be periodically energized in response to rotation of said timing motor including a first contact rotatable with the shaft of said timing motor, an adjustable member pivotally mounted on said timing motor, a stationary contact on said member adapted for periodic electrical engagement with said first contact, and means including an arcuate slot in said member for adjusting the position of said member to control the instant during one rotation of said timing motor that electrical engagement of said first contact with said stationary contact occurs whereby the instant of creation of said elastic waves as recorded on said record strip coincides exactly with one of said timing lines produced on said record strip.

RAYMOND U. McKINNEY.

REFERENCES CITED

The following references are of record in the file of this patent:

UNITED STATES PATENTS

| Number | Name | Date |
| --- | --- | --- |
| 2,313,091 | Renner | Mar. 9, 1943 |